United States Patent [19]

Graham

[11] 4,121,790
[45] Oct. 24, 1978

[54] COMBUSTION-PRODUCT RETARDANT BARRIER SYSTEM FOR AIDING PASSENGER ESCAPE FROM AIRCRAFT FUSELAGE STRUCTURE

[76] Inventor: Edward F. Graham, 349 Rosebank Ave., Baltimore, Md. 21212

[21] Appl. No.: 808,740

[22] Filed: Jun. 22, 1977

[51] Int. Cl.² .............................................. B64D 11/00
[52] U.S. Cl. .................................. 244/118 P; 49/34; 52/2; 98/36; 98/50; 105/376; 169/48
[58] Field of Search ................... 244/1 R, 121, 118 R, 244/118 P, 129.2; 169/11, 48, 53; 52/2; 49/34, 31, 68; 98/36, 50; 105/376, 468; 160/6, 44; 61/45 F, 45 R

[56] References Cited

U.S. PATENT DOCUMENTS

| | | | |
|---|---|---|---|
| 1,657,066 | 1/1928 | Burke | 98/36 |
| 2,396,039 | 3/1946 | Burton et al. | 244/118 P |
| 2,863,512 | 12/1958 | Mansfield | 169/48 |
| 2,947,239 | 8/1960 | Burgess | 98/50 |
| 3,423,121 | 1/1969 | Lipkin | 244/118 P X |
| 3,645,337 | 2/1972 | Livingston | 169/48 |
| 3,831,318 | 8/1974 | Richmond | 49/34 |
| 3,834,293 | 9/1974 | Danieli | 98/36 |
| 3,872,927 | 3/1975 | Stults | 169/48 |
| 3,960,216 | 6/1976 | Isobe | 169/48 |
| 3,990,464 | 11/1976 | Jenkins | 169/48 |
| 4,009,649 | 3/1977 | Thimons et al. | 98/50 |
| 4,023,372 | 5/1977 | Presler et al. | 49/34 |

OTHER PUBLICATIONS

Richard Hill et al., "Aircraft Cabin Compartmentation Concepts for Improving Postcrash Fire Safety".

*Primary Examiner*—Galen L. Barefoot
*Attorney, Agent, or Firm*—John F. McClellan, Sr.

[57] ABSTRACT

A temporary barrier for retarding heat, fire and smoke within a fuselage while permitting unobstructed physical access and visual access to escape routes by passengers and crew, includes a light-weight inflatable curtain system with air jet curtain structure guarding otherwise unobstructed access therethrough; in embodiments the system includes partial and full curtains, curtains movable for maximum isolation of combustion areas, and special sealing provisions.

20 Claims, 25 Drawing Figures

SCALE MODEL TEST
VEHICLE - 6" DIA. x 42" LONG

COMBUSTION-PRODUCT RETARDANT BARRIER SYSTEM FOR AIDING PASSENGER ESCAPE FROM AIRCRAFT FUSELAGE STRUCTURE

This invention relates generally to aircraft crash-safety systems and particularly to temporary systems for shielding against the effects of in flight and post crash fire.

In the prior art flexible curtains in various configurations have been disclosed as aircraft-fire and fume retardants, in a publication entitled "Aircraft Cabin Compartmentation Concepts For Improving Post-Crash Fire Safety," Report No. FAA-RD-76-131 (October, 1976) U.S. Department of Transportation, by Federal Aviation Administration.

Additionally, the following U.S. patents are believed pertinent. U.S. Pat. Nos.:

4,009,649 to E. D. Thimons et al., May 1, 1977, discloses a plastic sheet mine stop;

3,990,464 to James H. Jenkins, Nov. 9, 1976, discloses a heat-responsive inflatable bag apparatus for blocking a duct;

3,872,927 to Howard C. Stults discloses deployable porous barrier structure for use in fire situations;

3,834,293 to Luigi Danieli, Sept. 10, 1974, discloses an air barrier for constraint of combustion fumes;

3,831,318 to J. Kenneth Richmond, Aug. 27, 1974, discloses detector-responsive inflatable bag structure for mine shaft blocking;

2,947,239 to J. V. Burgess, Aug. 2, 1960, discloses plastic sheeting used as a barrier in mine shafts, and having provision for passage of traffic through the barrier; translucent sheeting is mentioned.

However, none of the prior art is believed to make fair suggestion of the combined structure of this invention or of the structure, function and advantages as exemplified by the following objects and brief summary which are given for purposes of cursive description only and not as limitation.

A principal object of this invention is to save lives and reduce injury and property loss in aircraft crashes by providing means for isolating fire, hot gases and smoke while at the same time speeding passenger egress, providing longer escape time and reducing confusion to a substantially greater extent than is now possible.

Further objects are to provide a lightweight, fail-safe, self-deployable and self-supporting system compatible with existing aircraft, which can function at all orientations of an aircraft without blocking aisles or exits.

Still further objects are to provide a system as described which preserves a maximum of physical and visual and auditory access, which in particular embodiments helps to shield passengers from radiant heat, to protect them from flame and fumes carried through aircraft ventilation systems, and to some degree to supply exiting passengers with cooling, breathable air.

And yet further objects are to provide a system as described which is simple, economical, reliable, compact, easy and safe to use, and which requires no major modifications for installation in current aircraft configurations.

In brief, cursive description the invention includes an inflatable-barrier system with access-opening fume blockage by air curtain provisions and, in embodiments, provisions for moving one or more of the devices along a fuselage for protecting the greatest possible percentage of passengers in a given situation.

The above and other objects and advantages of this invention will become more readily understood on examination of the following description, including the drawings, in which like reference numerals denote like parts.

Figure 1:
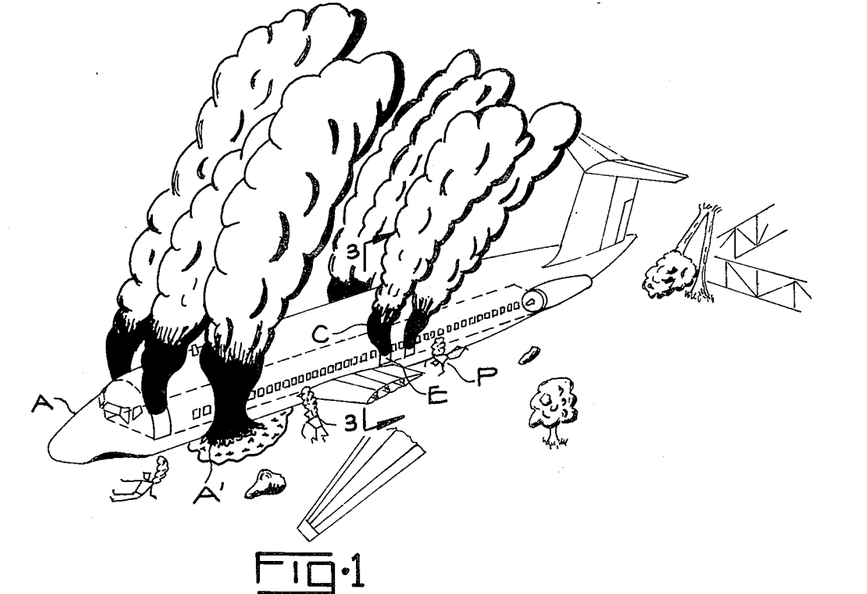
FIG. 1 is a perspective depiction of a crashed aircraft on fire and not equipped with the present invention.

FIG. 1 indicates that a crashed aircraft A, having a fire characteristically started at a broken front portion A' of the fuselage, often acts as a chimney, the fuselage ducting deadly combustion products, flame and hot gases including smoke C, along the passenger spaces and out the exits E. Upward inclination aft or a favoring breeze such as is characteristic in take-off and landing orientation will intensify the effect. Smoke blinds and fire burns the passengers P (and the crew) and hot and noxious gases kill them, often within the relatively short time available to reach an exit. As larger aircraft go into passenger service many risk factors increase, including hazards from panic, debris, malfunctioning slides and exits, crew injuries, aircraft orientation, asphyxiation and the like, in attempting to escape from burning aircraft.

Figure 2:
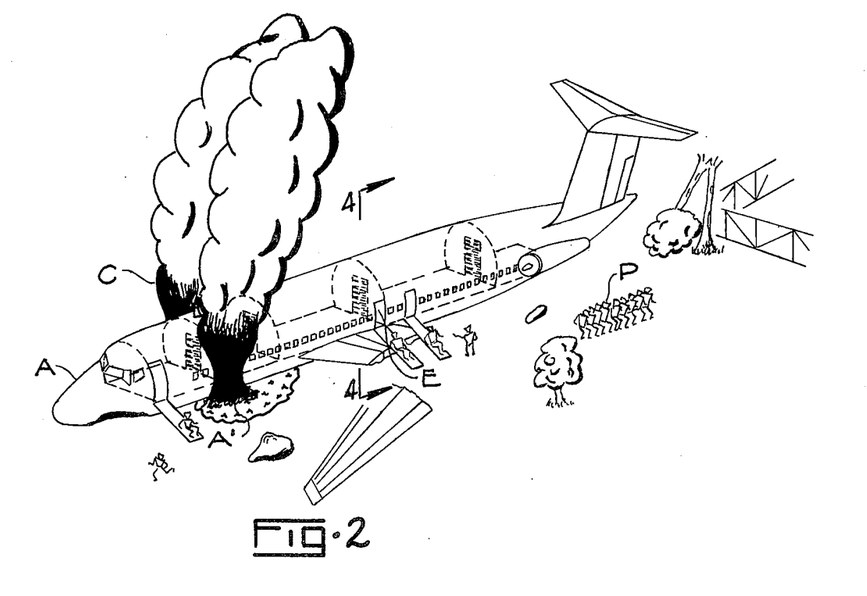
FIG. 2 is a perspective depiction of the same crashed aircraft on fire as it might appear equipped with the present invention.

FIG. 2 contrasts with FIG. 1 and depicts the vast improvement in escape probability believed achievable by using the present invention. In the same crash, the invention confines the combustion products C to the area of origin for a temporary period sufficient for orderly and safe exodus by the passengers P and crew.

Exits E remote from the fire origin remain unconcealed by smoke according to objects of this invention. Visibility and breathable atmosphere essential for orderly escape are preserved in adjacent compartments inside the aircraft.

Figure 3:
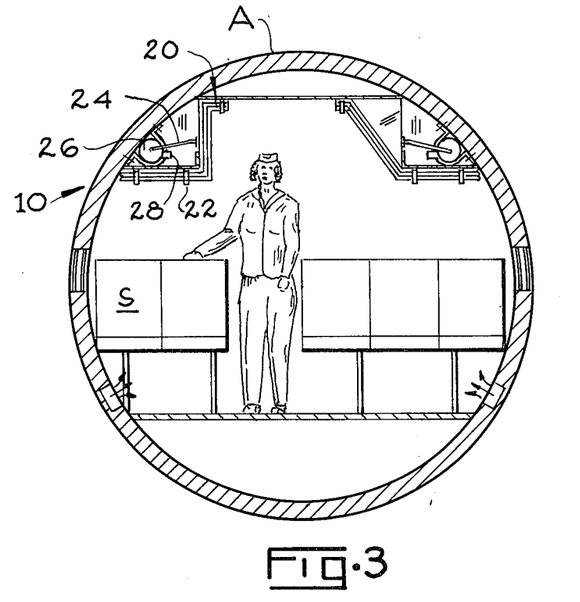
FIG. 3 is a transverse sectional elevational view of the fuselage of an aircraft equipped with a fixed embodiment of the present invention, the invention being shown in the stored configuration, ready for deployment.

FIG. 3 shows the invention in one embodiment 10 installed in an aircraft A, in stored configuration, ready for deployment in case of need. Inflatable plastic curtain assembly 20, permanently affixed at the upper margin by clamps to the overhead and constrained at the overhead in accordion folds by conventional means for storing such as breakable-tie or slip-out fasteners 22, has pneumatic connection 24 with fluid pressure source 26. In the folded configuration the unit infringes little on usable space in the aircraft interior, as can be seen.

Figure 4:
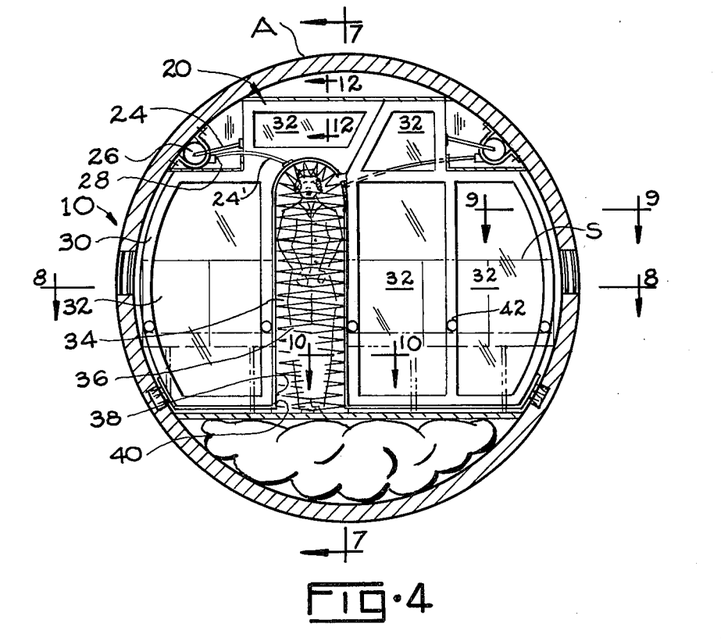
FIG. 4 is a transverse section of the fuselage of an aircraft as at 4—4, FIG. 2, and corresponding with FIG. 3, except that the invention is shown deployed after crash.

In operation, on actuation of a control 28, which may be a manual, inertial, thermal, acoustical, fume or combination sensor/actuator, the curtain releases itself and deploys inplane across the fuselage between the seats S as shown in the next Figure, under gas pressure.

FIG. 4 illustrates the deployed condition with the inflatable curtain assembly in full operation as a static and dynamic barrier against combustion products but with means permitting unobstructed physical, visual and auditory access through it by passengers and crew. Inflation tubing or tubular member 30 around the margins is filled, supporting interiorly by edge securance, integral, thin, preferably transparent sheeting panels 32 and leaving an open doorway 34 in the aircraft passenger aisle.

Completing the barrier against combustion products is an "air jet curtain" 36 across the passenger exit doorway formed by fluid jets from perforations 38 in a tubular margin 40 or fluid ejecting tubing framing the doorway. Preferably as means for establishing the air curtain a separate line 24' from the fluid source expells the fluid for the air curtain to insure proper pressure and volume without imposing undue requirements on the inflation tubing; this line may be under a second or higher pressure than the tubular member, as will be seen.

It will be appreciated that gas expelled across the doorway not only serves as a curtain, but also to an extent cools those passing through and the area generally. Additionally, if air is employed, the cool fresh air aids respiration at a crucial time, tending to restore fume victims. It is obvious that the fluid ejected can be a mixture of permanent gases or of gases mixed with condensible vapors such as water vapor as desired to suit the application. Preferably the source should supply gas for at least three minutes.

Circular areas 42 indicate the location of inflated inflatable braces, shown in a later Figure.

Figure 5:
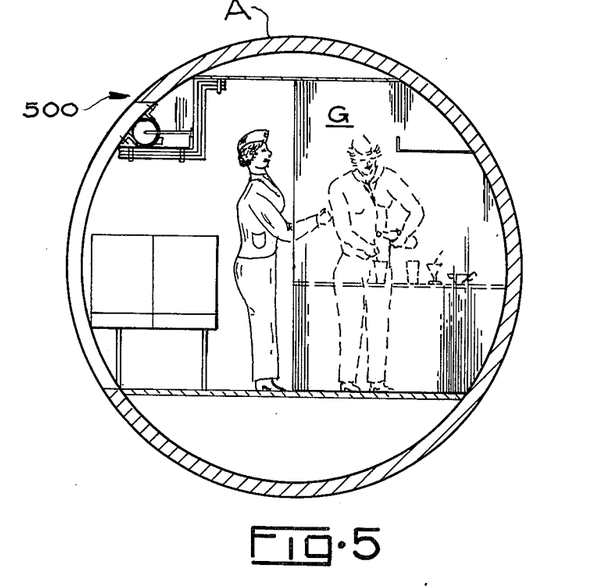
FIG. 5 is a transverse sectional elevational view of an aircraft fuselage showing a fixed embodiment of this invention adapted for use at a galley or the like, and in stored configuration.
Figure 6:
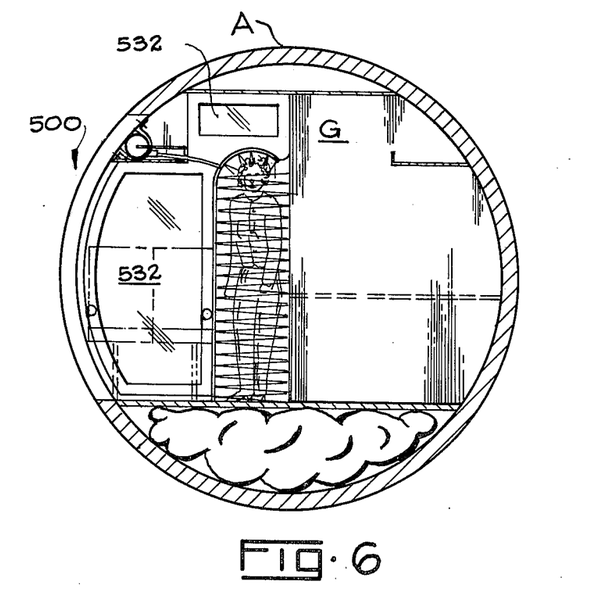
FIG. 6 shows the FIG. 5 fixed embodiment deployed.

FIGS. 5 and 6 illustrate versatility of the invention showing it respectively in secured and in deployed configuration in embodiment 500. This embodiment is essentially a half-curtain with laterally contiguous installation at a galley G or other obstruction across the fuselage where it coacts with the galley wall in forming a barrier to combustion products when deployed, while maintaining free access.

Figure 7:
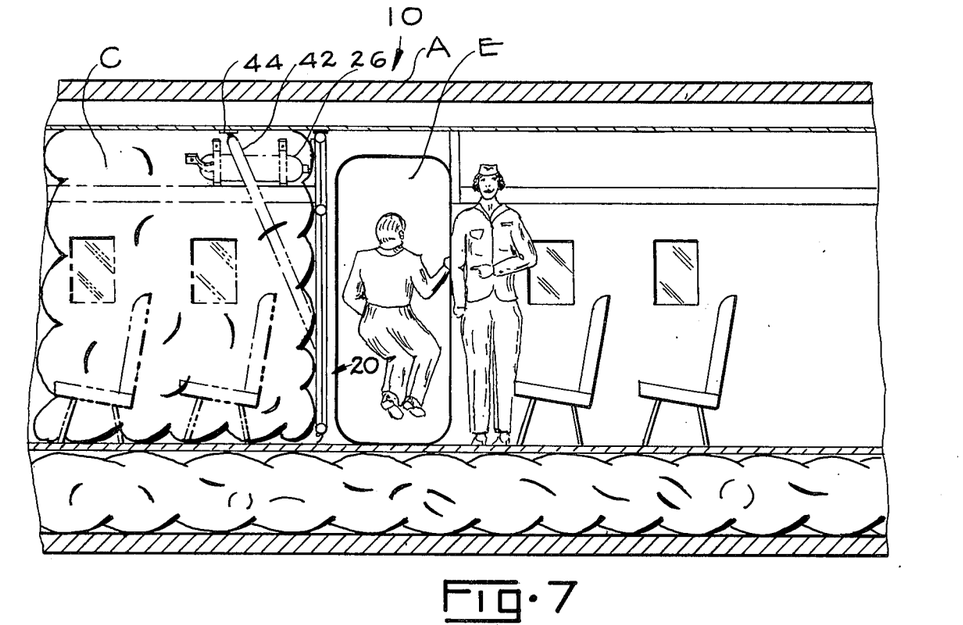
FIG. 7 is a longitudinal sectional elevational view of an aircraft fuselage, as at 7—7, FIG. 4, showing the invention in use.

FIG. 7 shows in side profile control of combustion products C according to an object of this invention and indicates the general side-view aspect of the inflatable-brace structure 42 deployed as an integral part from the lower half of the curtain assembly 20 upward at an acute angle to affixation 44 on the overhead of the aircraft A. The braces are to help position the curtain structure, yielding under heavy impact but tenaciously restoring position.

Figure 8:
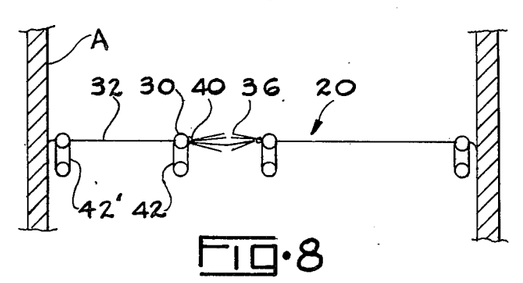
FIGS. 8, 9 and 10 are details taken respectively at 8—8, 9—9 and 10—10, FIG. 4.

FIG. 8 shows in plan section fuselage structure of the aircraft A and the relation of the inflatable braces 42 to the inflation tubing 30 supporting the fluid ejection tubing 40 framing the open doorway in the curtain assembly 20 and ejecting the air curtain 36, and that braces 42' may also be used at the margins. Deployed relation of the transparent plastic panels 32 is also shown.

Material for the unit is preferably transparent as noted, of relatively high char point and self-extinguishing characteristics, tough and durable, and flexible at sub-freezing temperatures. Various commercially available plastics or fire resistant fabrics meet these requirements, an example being polymer thermoplastic sold under the name "KAPTON" and manufactured by E. I. Du Pont Nemours Co.

Thickness of the panels may be for example, 0.002 inch (0.05mm) to resist tearing; the tubing portions may be of the same thickness and 4 inches (10 cm) in diameter; the fluid-ejecting portions may advantageously be as thick or thicker—up to 0.010 inch (2.5 mm) and 1 inch (25 mm) in diameter, with tenth-inch (2.5 mm) orifices on 2 inch (50 mm) centers, and gas pressure and flow proportioned accordingly by means to be described.

Figure 9:
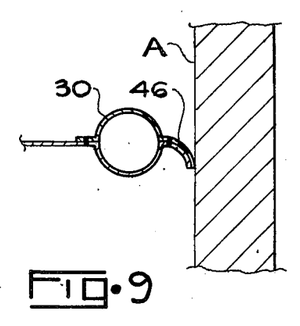

FIG. 9 details provision according to this invention of flexible strip sheeting 46 protruding from the outer margin of the curtain inflation tubing 30 for sealing against the fuselage of the aircraft A.

Figure 10:
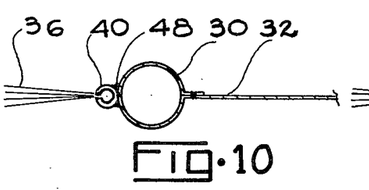

FIG. 10 details on larger scale the relation of the fluid-ejecting tubing 40 to the doorway-framing inflation tubing 30; these may be made integral or may be cemented together as at 48.

Figures 11, 13:
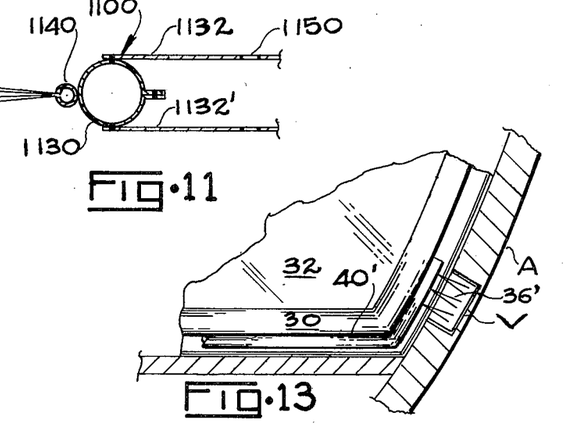
FIG. 11 is a detail similar to that of FIG. 10 but of an alternative structure.
FIG. 13 is a front view detail partially in section of the lower outside corner of the curtain.

FIG. 11 shows details of an embodiment 1100 in which the fluid-ejecting tubing 1140 and the inflation tubing 1130 are generally the same as before, but two panels 1132, 1132' of sheeting are provided, preferably cemented or otherwise affixed tangent to the inflation tubing to obtain the greatest spacing between the panels. Small perforations 1150 may be provided to insure ready deployment by venting the spacing between the panels. This double-wall structure is intended to provide better insulation than the single-wall embodiment. Any small sacrifice in weight and visibility is presumably more than made up for by the backup rip-resistance and rigidity afforded.

Figure 12:
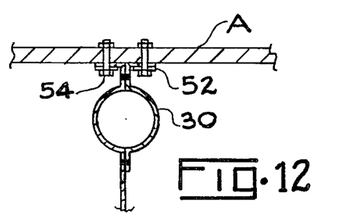
FIG. 12 is a transverse sectional view taken at 12—12, FIG. 4.

FIG. 12 illustrates that strips 52 and screws, bolts or rivets 54 may be used to affix the curtain margins permanently to the overhead of the aircraft A.

FIG. 13 shows provision of an extension part 40' of the fluid ejecting tubing which may be positionable on deployment to a location over the aircraft ventilation ducting V, across which an air curtain 36' is established to serve as a combustion products barrier.

Figure 14:
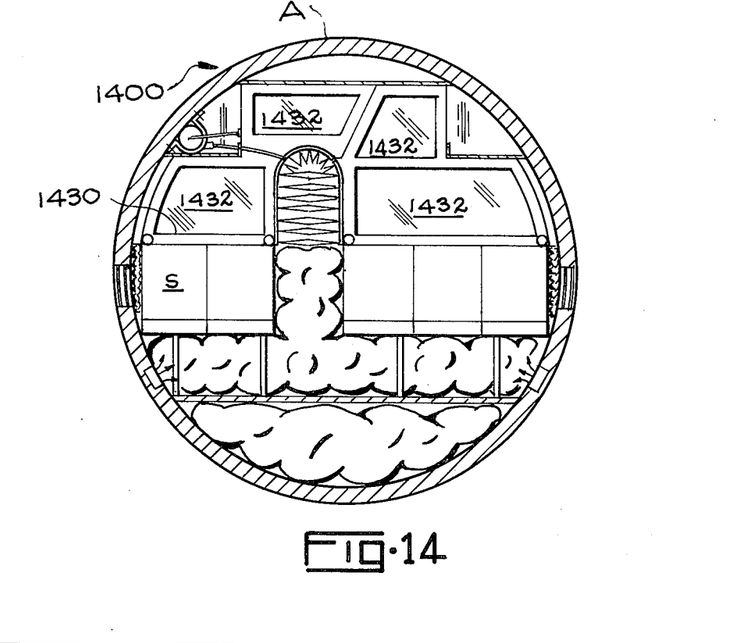
FIG. 14 is a view similar to FIG. 4 but of an alternative embodiment.

FIG. 14 illustrates an embodiment 1400 which is vertically shorter than the previous embodiments and employs the aircraft seat structure S, considered as a part of the fuselage structure for these purposes, as part of the barrier, the lower inflation tubing 1430 running along the upper part of the seatbacks in vertically-contiguous relation.

Figure 15:
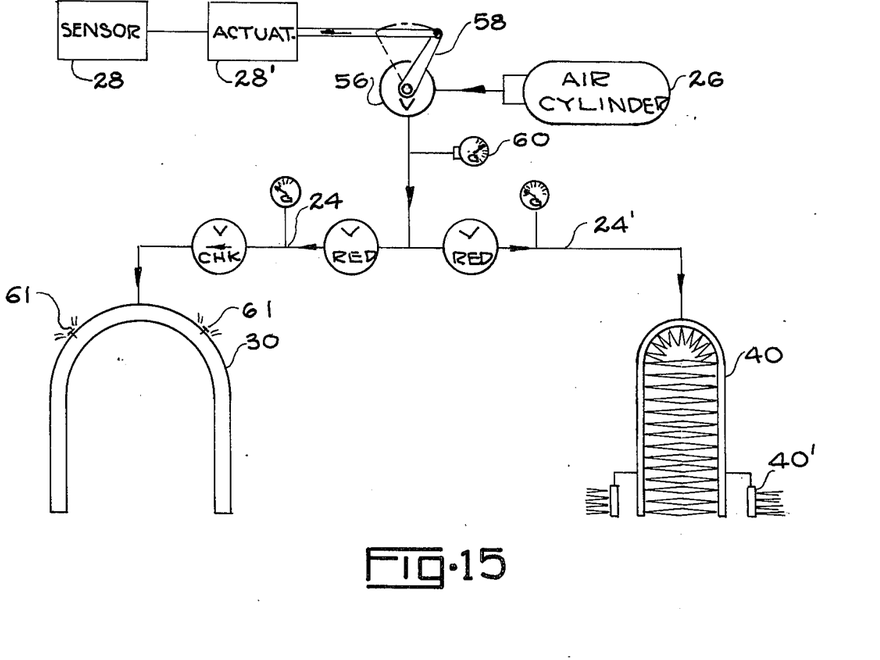
FIG. 15 is a diagram of a fluid distribution system as used in this invention.

FIG. 15 diagrams a conventional fluid system for use with the invention.

Sensor 28 and actuator 28' may be combined and, as indicated, may include any conventional means for the purpose.

Preferably the entire system operates on fluid pressure, in which case the actuator may be a pneumatic cylinder assembly. On actuation, valve 56 opens through crank means 58, admitting gas from cylinder 26 through respective reduction valves and pressure lines 24, 24' (higher pressure) to the inflation tubing 30 and fluid ejecting tubing 40, 40'. Suitable gauges 60 are preferably provided in accordance with conventional practice. As generally indicated, volume, pressure, tube diameter and ejection orifice size and spacing may all be conventionally arrived at to suit the application by following general principles of the invention. Pop-off valves appear at 61.

Figures 16, 17, 18, 19, 20:
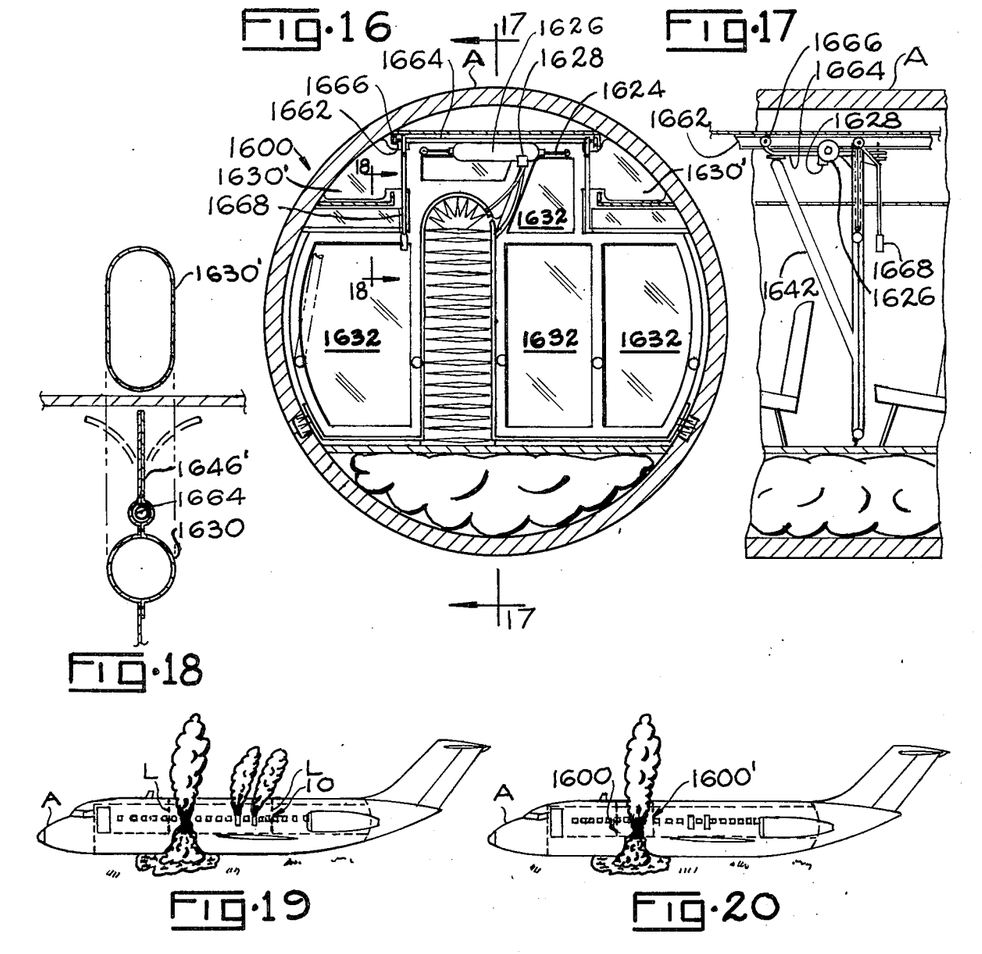
FIG. 16 is a transverse sectional elevational view similar to FIG. 6 but of an alternative embodiment.
FIG. 17 is a view taken at 17—17, FIG. 16.
FIG. 18 is a sectional detail.
FIG. 19 is a side elevational view depicting a crashed aircraft equipped with the invention; fixed embodiment.
FIG. 20 is a side elevational view depicting the same crashed aircraft equipped with a movable curtain embodiment of this invention.

FIGS. 16 and 17 detail further provisions of the invention in an embodiment 1600. One or more complete curtain assemblies according to this embodiment are mounted for movement along the aircraft fuselage by means of a conventional track 1662 longitudinally in the overhead of the aircraft A and a carriage 1664 with wheels 1666 engaging the track.

A lock-and-release handle 1668 provides means for an attendant or other person to release the curtain assembly carriage, move it adjacent the source of combustion products, and lock it there, preferably before deployment of the curtain. For that purpose the track may have notches conventionally engageable by means associated with the handle; this structure is indicated in a later Figure. The inflatable brace structure 1642 is affixed to the carriage and the fluid source 1626 control 1628 and associated lines and equipment are carried by it. Deflectable ballooned lateral extensions 1630' of the inflatable tubing seal the over-the-rack spaces.

FIG. 18 indicates that a moving seal 1646' similar to the strip outboard the inflation tubing 1630 as previously described may be employed in this embodiment for passing over individually protruding passenger service units.

FIG. 19 illustrates the need for this moving barrier embodiment. If curtain barriers 10 are at locations L remote from the source of combustion products, numbers of passengers may remain needlessly unaided by the invention.

FIG. 20 shows two of the movable curtain barriers 1600, 1600', efficiently moved to locations immediately adjacent the origin of the combustion products, giving escape opportunity to the maximum number of passengers possible. The proportion of passengers additionally helped in this manner can be as high as 31%, or in numbers proportioned on large presently used aircraft, 140 people.

Figure 21:
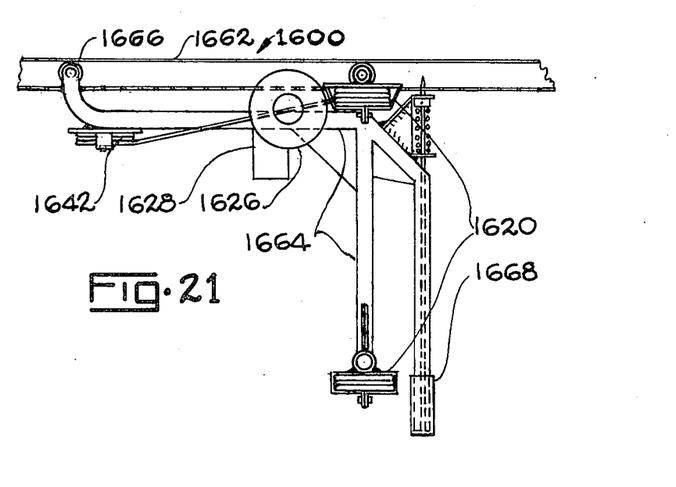
FIG. 21 is an enlarged detail adapted from FIG. 17.

FIG. 21 details generally one form of carriage which may be used to move the curtain assemblies of embodiment 1600. 1662 is a notched track fixed to the overhead of the aircraft; 1664 is the carriage frame; 1666 are the carriage wheels, 1620 the folded curtain assembly; 1642 an inflatable brace; 1668 the handle which can lock into the track notches, and retract from them to free the carriage; 1626 the inflation gas supply; 1628 the sensor and/or manual actuation control. It will be appreciated that the parts shown as extending downward lie to the side of the passenger aisle for best clearance.

Figure 22:
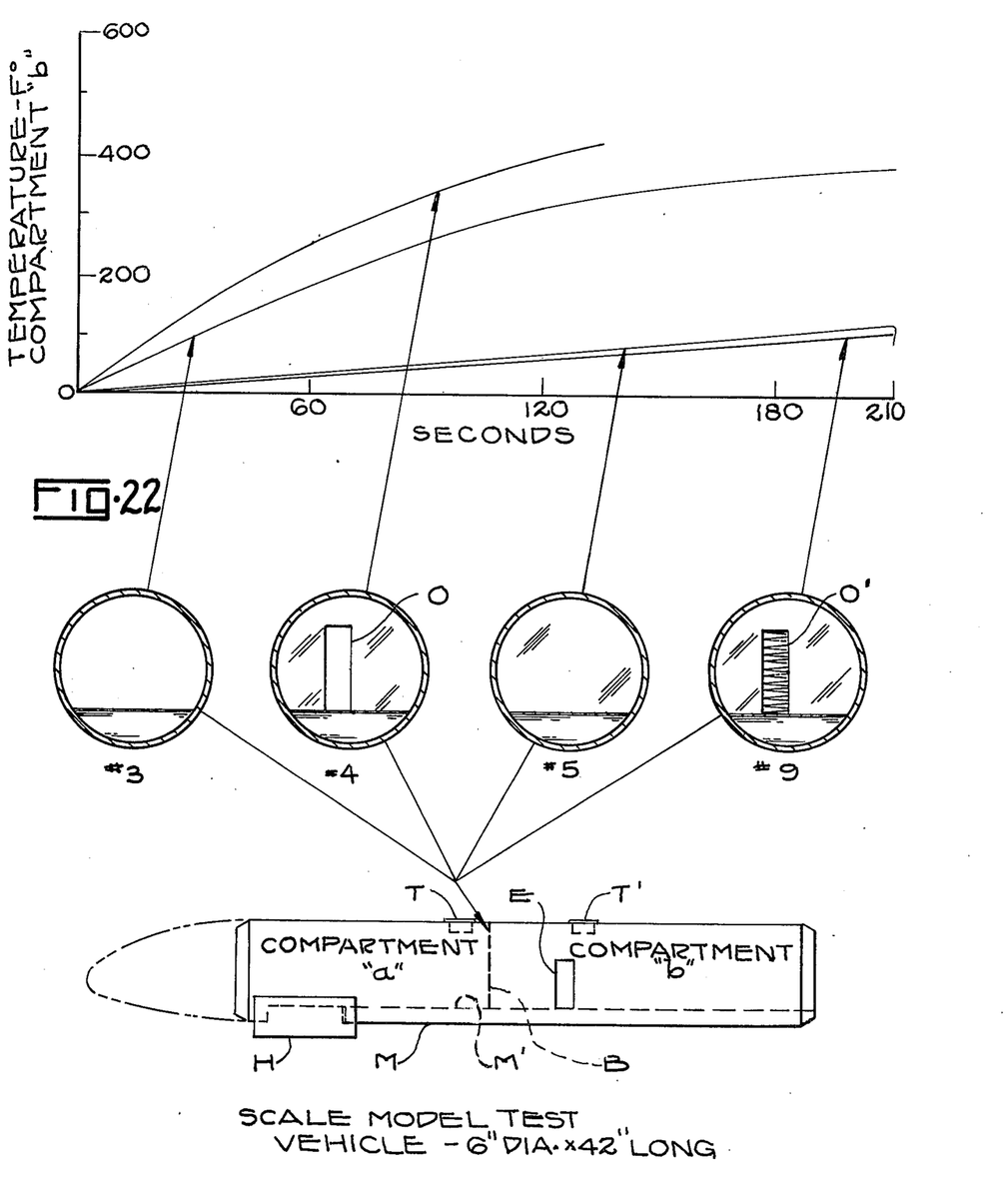
FIG. 22 is a diagrammatic indication of temperature performance from data from small scale tests.

FIG. 22 shows particular results from small-scale experiments by the inventor.

At the bottom is diagrammed an aircraft-fuselage simulative test model M, 34 inches long by 6 inches inside diameter (8.5 cm by 15 cm) constructed by the inventor, of standard steel stovepipe.

A simulated aircraft floor M' of the same material was provided. Exit doorway E is 1¼ by 2½ inches (3.17 by 6.35 cm) in size and 22⅛ inches (56.2 cm) back from the lefthand or forward end.

Combustion products generated using a natural gas source were admitted at H, a hole 3 × 3½ inches (7.6 × 8.9 cm) beneath the fuselage at the extreme forward end. Temperature was measured by thermometers inserted through the fuselage top at T and T' 13½ inches and 21½ inches (34.3 and 54.6 cm) from the front bulkhead.

Provision was made at B, 16 inches (40.6 cm) back from the forward end for test of barriers of various interchangeable 0.002 inch thick (0.05 mm) "KAPTRON" plastic curtain configuration, one at a time. Nos. 3, 4, 5 and 9 shown, indicate particular tests.

In No. 3 no curtain was used, floor height is indicated. In No. 4 a doorway opening O was used as shown, ½ × 4 inches (1.2 by 10.1 cm). In No. 5 the curtain fully closed off the fuselage, and test No. 6 was like No. 4 but with air jet provisions at the open doorway O' comprising 32 apertures evenly spaced in a tubing along the doorway opening as indicated by the air-jet symbols. It is estimated that 2.08 c.f.m. of air at 25° C. was pumped through the test unit barrier holes by a small hand vacuum cleaner.

Arrows correlate each test representation with results on the temperature/time scale plotted above. Target escape time is 90 seconds or less for real life aircraft passenger emergency egress. It can be seen that the curves in the solid curtain test (5) and in the air curtain test (9) are relatively close and indicate much lower temperatures, much slower temperature rise during target escape-time, and more linear escapetime temperature rise than the curves in the no-curtain test (3) and the open aisle-doorway test (4). Visual observations indicate that smoke was not visible past the air curtain as compared with smoke emission observed during the other test configurations.

It is believed that these results will translate in full scale real life situations into appreciably lower passenger mortality and injury.

Figure 23:
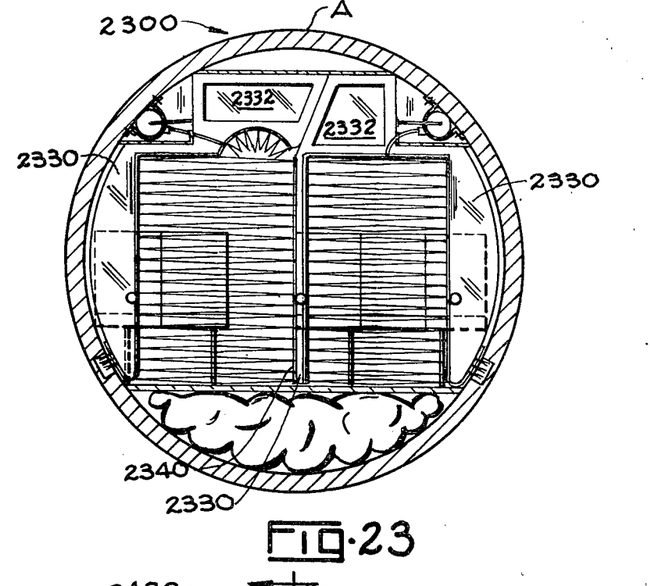
FIG. 23 is a view similar to that of FIG. 4 but of another embodiment.

FIG. 23 illustrates a further embodiment 2300 with an air curtain to either side of central inflation and fluid ejection tubing 2330, 2340. Coacting structure of the same type is provided at the walls of the aircraft A. This extreme configuration evidently would require more gas capacity than previous embodiments, substantially eliminating as it does the membrane or curtain panel structure, and is estimated to be in the proportions shown, less efficient.

Figure 24:
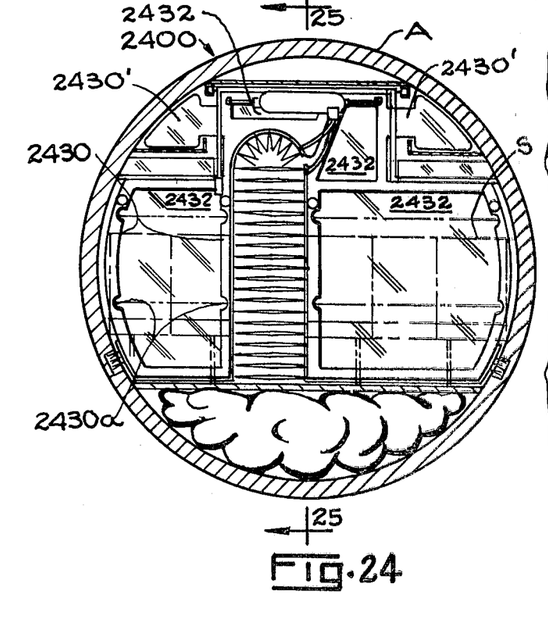
FIG. 24 is a view similar to that of FIG. 16 but of another embodiment.
Figure 25:
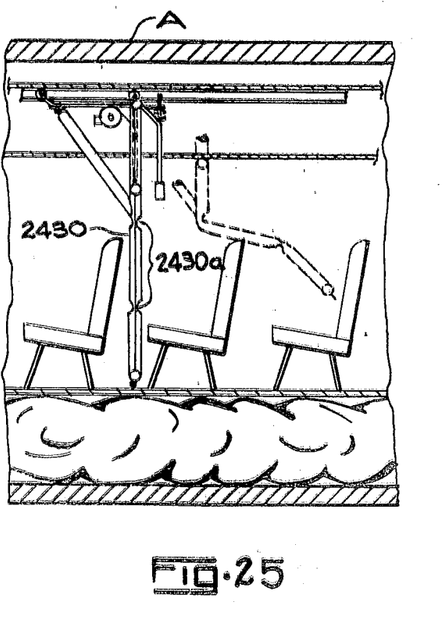
FIG. 25 is a view taken at 25—25, FIG. 24.

FIGS. 24 and 25 illustrate a further embodiment 2400 similar to that of FIGS. 16 and 17 except that the necessarily relatively large diameter inflation tubing used in all embodiments is modified. Here, the inflation tubing 2430 has crimps or reduced-section areas 2430a at spaced intervals making it easier to drag over seats in post-inflation positioning of it at desired locations along the fuselage. The curtain bends (dotted lines) more easily when passing seats or other obstacles.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be secured by United States Letters Patent is:

1. A combustion-product retardant barrier system for aiding passenger escape from aircraft fuselage structure, comprising: a curtain assembly, means for storing the curtain assembly collapsed, means for deploying the curtain assembly across a passage in aircraft fuselage structure, and means for providing unobstructed passenger access but retarding passage of combustion products through said curtain assembly upon deployment.

2. A system as recited in claim 1, the curtain assembly including at least one panel, at least one tubular member for supporting said panel when deployed, the deploying means including: a fluid pressure source, means for controlling the fluid pressure source, means for connecting the fluid pressure source for inflating the tubular member; the means for providing comprising: the curtain assembly defining an open doorway portion, and means for establishing an air curtain across said open doorway.

3. A system as recited in claim 2, said panel comprising at least one sheet of material having edge securance to said tubular member.

4. A system as recited in claim 3, said panel comprising plural, spaced sheets of material.

5. A system as recited in claim 4, the panel structure perforate for venting said space between the sheets of material.

6. A system as recited in claim 2, the means for controlling the pressure source including means for producing a first pressure in the tubular member and means for producing a second pressure greater than the first pressure in the means for establishing an air curtain.

7. A system as recited in claim 6, the means for establishing an air curtain including perforate tubing at the open doorway portion.

8. A system as recited in claim 7, the perforate tubing having a part thereof positionable by deployment of the curtain assembly for establishing an air curtain across structure other than said open doorway portion, whereby said air curtain can extend across a vent opening or the like in said an aircraft fuselage structure.

9. A system as recited in claim 2, the means for deploying including means for releasing fluid from the fluid pressure source through the means for connecting as result of one or more of the following: aircraft impact actuation, heat actuation, smoke actuation, acoustical actuation, manual actuation.

10. A system as recited in claim 2, at least one inflatable brace on the curtain assembly and extensible therefrom by deployment of the curtain assembly.

11. A system as recited in claim 2, and flexible strip sheeting protruding from a margin of the tubular member for thereby sealing against a said aircraft fuselage structure.

12. A system as recited in claim 2, and means for moving said system along a said aircraft fuselage structure for improving location for combustion product retardation.

13. A system as recited in claim 12, the means for moving including longitudinal track, a carriage on said track, the carriage supporting said system, and means for locking the carriage to the track and for releasing the carriage for movement along the track.

14. A system as recited in claim 13, the tubular member having at least one reduced-section portion positioned for aiding bending when moved for easier passage of obstacles.

15. A system as recited in claim 13, plural of said carriages supporting plural respective said systems with respective said locking and releasing means.

16. A system as recited in claim 2, said curtain having shape for defining said an open doorway portion laterally contiguous with a portion of said an aircraft fuselage structure.

17. A system as recited in claim 2, said curtain having shape for defining a portion of a barrier in vertically contiguous relation with a portion of said an aircraft fuselage structure.

18. A system as recited in claim 2, the at least one panel being transparent.

19. A combustion-product retardant barrier system for aiding passenger escape from aircraft fuselage passage structure, comprising: a collapsible curtain assembly, first fluid pressure means for deploying the collapsible curtain assembly across said aircraft fuselage passage structure, the curtain assembly having an access opening therein, second fluid pressure means, including collapsible perforate tubing for establishing an air curtain across said access opening.

20. The method of restraining movement of combustion products in aircraft fuselage passage structure while maintaining free access for movement of occupants along said passage, comprising the steps:
(a) deploying a collapsible curtain having an access opening therethrough across the aircraft fuselage passage structure, and
(b) establishing an air curtain across said access opening, thereby restraining movement of combustion products while maintaining free access for movement of occupants.

* * * * *